US010002123B2

(12) United States Patent
Whitman et al.

(10) Patent No.: US 10,002,123 B2
(45) Date of Patent: *Jun. 19, 2018

(54) NAMED ENTITY EXTRACTION FROM A BLOCK OF TEXT

(71) Applicant: SPOTIFY AB, Stockholm (SE)

(72) Inventors: Brian Whitman, Cambridge, MA (US); Hui Cao, Belmont, MA (US)

(73) Assignee: Spotify AB, Stockholm (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/364,639

(22) Filed: Nov. 30, 2016

(65) Prior Publication Data

US 2017/0083505 A1 Mar. 23, 2017

Related U.S. Application Data

(63) Continuation of application No. 14/736,516, filed on Jun. 11, 2015, now Pat. No. 9,600,466, which is a (Continued)

(51) Int. Cl.
*G06F 17/00* (2006.01)
*G06F 17/27* (2006.01)
(Continued)

(52) U.S. Cl.
CPC .......... *G06F 17/2705* (2013.01); *G06F 17/21* (2013.01); *G06F 17/273* (2013.01);
(Continued)

(58) Field of Classification Search
CPC ......... G06F 17/278; G06F 17/28; G06F 17/30
(Continued)

(56) References Cited

U.S. PATENT DOCUMENTS 5,577,249 A 11/1996 Califano
6,041,331 A * 3/2000 Weiner .............. G06F 17/30716
(Continued)

FOREIGN PATENT DOCUMENTS

| CA | 2 253 744 A1 | 5/2000 |
| EP | 1 675 020 A2 | 6/2006 |
| WO | 2010/087909 A1 | 8/2010 |

OTHER PUBLICATIONS

Int'l Search Report and Written Opinion of the Int'l Searching Authority for Int'l Pat. Appln. No. PCT/US2013/034127, dated May 8, 2013.

(Continued)

*Primary Examiner* — Daniel Abebe
(74) *Attorney, Agent, or Firm* — Merchant & Gould P.C.

(57) ABSTRACT

A data processing method, program, and apparatus for identifying a document within a block of text. A block of text is tokenized into a plurality of text tokens according to at least one rule parser. Each of the plurality of text tokens is sequentially compared to a plurality of document tokens to determine if the text token matches one of the plurality of document tokens. The plurality of document tokens correspond to a plurality of documents which have been tokenized according to the one or more rule parsers. Each matched text token is filtered according to predetermined filtering criteria to generate one or more candidate text tokens. It is then determined whether sequence of candidate text tokens that occur in sequential order within the block of text match sequence of document tokens. If so, then it is determined that the document has been identified within the block of text. The document can correspond to an artist, a song names, and misspellings and aliases thereof.

17 Claims, 11 Drawing Sheets

Related U.S. Application Data continuation of application No. 13/850,044, filed on Mar. 25, 2013, now Pat. No. 9,158,754.

(60) Provisional application No. 61/617,563, filed on Mar. 29, 2012.

(51) Int. Cl.
  *G06F 17/21* (2006.01)
  *G06F 17/30* (2006.01)
  *G10L 15/26* (2006.01)

(52) U.S. Cl.
  CPC .......... *G06F 17/277* (2013.01); *G06F 17/278* (2013.01); *G06F 17/30011* (2013.01); *G06F 17/30622* (2013.01); *G06F 17/30699* (2013.01); *G06F 17/30867* (2013.01); *G10L 15/26* (2013.01)

(58) Field of Classification Search
  USPC .......................................................... 704/10
  See application file for complete search history.

(56) References Cited

U.S. PATENT DOCUMENTS

| | | | |
|---|---|---|---|
| 7,493,293 B2 * | 2/2009 | Kanungo | G06F 17/278 706/12 |
| 7,772,478 B2 | 8/2010 | Whitman et al. | |
| 7,822,597 B2 * | 10/2010 | Brun | G06F 17/271 704/1 |
| 8,050,921 B2 | 11/2011 | Mark et al. | |
| 8,494,987 B2 * | 7/2013 | Katukuri | G06F 17/3061 706/13 |
| 9,110,955 B1 | 8/2015 | Bernhardsson | |
| 9,489,371 B2 * | 11/2016 | Bonnet | G06F 17/2715 |
| 2004/0162827 A1 * | 8/2004 | Nakano | G06F 17/30675 |
| 2006/0047502 A1 | 3/2006 | Ramsey et al. | |
| 2006/0123000 A1 | 6/2006 | Baxter et al. | |
| 2008/0005651 A1 | 1/2008 | Grefenstette et al. | |
| 2008/0059461 A1 | 3/2008 | Brock et al. | |
| 2008/0071519 A1 | 3/2008 | Brun et al. | |
| 2008/0147711 A1 | 6/2008 | Spiegelman et al. | |
| 2009/0182554 A1 * | 7/2009 | Abraham | G06F 17/2765 704/9 |
| 2009/0292660 A1 | 11/2009 | Behal et al. | |
| 2009/0319500 A1 | 12/2009 | Agrawal et al. | |
| 2009/0326926 A1 * | 12/2009 | Landau | G06F 17/30548 704/9 |
| 2009/0327249 A1 | 12/2009 | Pappas | |
| 2010/0030715 A1 * | 2/2010 | Eustice | G06Q 10/10 706/12 |
| 2010/0121889 A1 | 5/2010 | Arumainayagam et al. | |
| 2010/0161623 A1 | 6/2010 | Torbjornsen | |
| 2010/0195909 A1 * | 8/2010 | Wasson | G06F 17/241 382/176 |
| 2010/0293179 A1 | 11/2010 | Chaudhuri et al. | |
| 2010/0313258 A1 | 12/2010 | Chaudhuri et al. | |
| 2011/0282856 A1 | 11/2011 | Ganti et al. | |
| 2012/0036130 A1 | 2/2012 | Light et al. | |
| 2012/0041969 A1 | 2/2012 | Priyadarshan et al. | |
| 2013/0110839 A1 * | 5/2013 | Kirshenbaum | G06F 17/30705 707/740 |
| 2013/0262469 A1 | 10/2013 | Whitman | |
| 2013/0262471 A1 | 10/2013 | Whitman et al. | |
| 2014/0195884 A1 | 7/2014 | Castelli et al. | |

OTHER PUBLICATIONS

Int'l Search Report and Written Opinion of the Int'l Searching Authority for Int'l Pat. Appln. No. PCT/US2013/034132, dated Jun. 6, 2013.

Int'l Search Report and Written Opinion of the Int'l Searching Authority for Int'l Pat. Appln. No. PCT/US2013/034130, dated Jun. 26, 2013.

* cited by examiner

201

ARTIST NAME: DAVE MATTHEWS BAND

ARTIST ID: AR1234
DOCUMENT ID: F3X89

| TOKENS | POSITION |
|---|---|
| "DAVE" | [1] |
| "MATTHEWS" | [2] |
| "BAND" | [3] |
| "<DAVE>" | [1] |
| "<MATTHEWS>" | [2] |
| "<BAND>" | [3] |

ARTIST NAME: DMB

ARTIST ID: AR1234
DOCUMENT ID: F3X90

| TOKENS | POSITION |
|---|---|
| "DMB" | [1] |
| "<DMB>" | [1] |

ARTIST NAME: DAVE MATTHEWS

ARTIST ID: AR1234
DOCUMENT ID: F3X91

| TOKENS | POSITION |
|---|---|
| "DAVE" | [1] |
| "MATTHEWS" | [2] |
| "<DAVE>" | [1] |
| "<MATTHEWS>" | [2] |

ARTIST NAME: DAVE MATHEWS BAND

ARTIST ID: AR1234
DOCUMENT ID: F3X92

| TOKENS | POSITION |
|---|---|
| "DAVE" | [1] |
| "MATHEWS" | [2] |
| "BAND" | [3] |
| "<DAVE>" | [1] |
| "<MATHEWS>" | [2] |
| "<BAND>" | [3] |

*FIG. 2D*

NAME DATABASE INVERTED INDEX

| TOKEN | DOCUMENT/POSITION |
|---|---|
| "DAVE" | [F3x89, 1] [F3x91, 1] [F3x92, 1] |
| "MATTHEWS" | [F3x89, 2] [F3x91, 2] |
| "BAND" | [F3x89, 3] [F3x92, 3] |
| "DMB" | [F3x90, 1] |
| "MATHEWS" | [F3x92, 2] |
| "<DAVE>" | [F3x89, 1] [F3x91, 1] [F3x92, 1] |
| "<MATTHEWS>" | [F3x89, 2] [F3x91, 2] |
| "<BAND>" | [F3x89, 3] [F3x92, 3] |
| "<DMB>" | [F3x90, 1] |
| "<MATHEWS>" | [F3x92, 2] |

ARTIST NAME: QUEEN

ARTIST ID: AR5678

DOCUMENT ID: F2x01

| TOKENS | POSITION |
|---|---|
| "QUEEN" | [1] |
| "<QUEEN>" | [1] |

ARTIST NAME: FREDDIE MERCURY

ARTIST ID: AR5679

DOCUMENT ID: F2x02

| TOKENS | POSITION |
|---|---|
| "FREDDIE" | [1] |
| "MERCURY" | [2] |
| "<FREDDIE>" | [1] |
| "<MERCURY>" | [2] |

ARTIST NAME: QUEEN LATIFAH

ARTIST ID: AR3456

DOCUMENT ID: F2x03

| TOKENS | POSITION |
|---|---|
| "QUEEN" | [1] |
| "LATIFAH" | [2] |
| "<QUEEN>" | [1] |
| "<LATIFAH>" | [2] |

NAME DATABASE INVERTED INDEX

| TOKEN | DOCUMENT/POSITION |
|---|---|
| 601 — "QUEEN" | [F2x01, 1] [F2x03, 1] |
| 602 — "FREDDIE" | [F2x02, 1] |
| 603 — "MERCURY" | [F2x02, 2] |
| 604 — "LATIFAH" | [F2x03, 2] |
| 605 — "<QUEEN>" | [F2x01, 1] [F2x03, 1] |
| 606 — "<FREDDIE>" | [F2x02, 1] |
| 607 — "<MERCURY>" | [F2x02, 2] |
| 608 — "<LATIFAH>" | [F2x03, 2] |

*FIG. 6*

NAMED ENTITY EXTRACTION FROM A BLOCK OF TEXT

CROSS REFERENCE TO RELATED APPLICATION

This application is a continuation application of U.S. patent application Ser. No. 14/736,516 filed Jun. 11, 2015, which is currently pending, which is a continuation application of U.S. patent application Ser. No. 13/850,044 filed Mar. 25, 2013, now U.S. Pat. No. 9,158,754, which claims priority to U.S. Provisional Application No. 61/617,563 filed Mar. 29, 2012, the contents of which are incorporated herein by reference.

BACKGROUND OF THE INVENTION

Field of the Invention

The present invention relates generally to extracting information from a block of text, and more particularly to extracting artist names and song titles.

Related Art

Music service providers that stream content to their customers have become a major component of the music industry. In the music industry, for example, the streaming content often includes descriptive material about the artists and songs, such as biographical information as well as current events information. To stay current, relevant information must be continually acquired.

Such information, however, can come from a variety of sources. For example, a local or national news organization may choose to run a story on a particular artist or song. This commonly occurs when an artist plays in a city or town covered by the news organization. With the advent of the Internet, these stories are commonly published online. In addition, some news media organizations are dedicated to the music industry, such as VH1, MTV, and Rolling Stone, who also provide coverage of artists and songs.

These traditional news providers, however, are not the only sources of relevant information on artists and songs. In fact, the growing use of social media has dramatically increased the number of potential sources of information. For example, concert-goers can provide commentary via blogs, feeds (e.g., Twitter feeds), posts (e.g., Facebook or Google+ posts), and other social media venues. Oftentime, this information is available long before a traditional news provider provides any information about the song, artist, or related events. In addition, the pervasive use of smartphones for instant access to the Internet and social media has exponentially increased the number of sources and correspondingly increased the amount of information available. While almost all of this information is available over the Internet, it is in a highly decentralized form, which creates an obstacle to efficient retrieval and analysis.

Relevant information may also be combined with other information which is not related to the artist or song. For example, the average social media page, such as a Facebook page, contains only a small amount of information, if any, relating to artists or songs. A Twitter feed may only contain a few tweets relating to an artist or song. A web log may only contain one post directed to an artist or song out hundreds of posts.

Automated recovery of information on artists and songs from the Internet can therefore be advantageous. One significant technical challenge to accomplishing this is recognizing that a particular set of data refers to an artist or song. Almost every word in the English language corresponds to an artist's name. For example, the band "Queen." Thus, a system which can distinguish between common English words and named entities is advantageous. Furthermore, webpages can be in any language. Thus, a system which can identify an artist or song name regardless of the language the webpage is written in is also desirable. Still a further technical complication is that artists and songs often have aliases or abbreviations which are used instead of their formal or legal names. For example, Dave Matthews Band may be referred to as either "Dave Matthews" or "DMB." Thus, recognizing aliases and abbreviation is also advantageous. In addition, artist and song names are often misspelled. The information that is being reported may nonetheless be relevant; so it is also advantageous to be able to recognize misspellings of artist names or songs.

BRIEF DESCRIPTION

The present invention provides methods, apparatuses, and computer readable mediums for extracting a named entity from a block of text.

In one embodiment, a data processing method of identifying a document within a block of text includes tokenizing, comparing, filtering, and matching steps. A block of text is tokenized into a plurality of text tokens according to at least one rule parser. Each of the plurality of text tokens is sequentially compared to a plurality of document tokens to determine if the text token matches one of the plurality of document tokens. The plurality of document tokens correspond to a plurality of documents which have been tokenized according to the at least one rule parser. Each matched text token is filtered according to predetermined filtering criteria to generate one or more candidate text tokens. A sequence of candidate text tokens from the one or more candidate text tokens is then matched to a sequence of document tokens. These candidate text tokens occur in sequential order within the block of text.

In another embodiment, a non-transitory computer readable storage medium stores a computer program for causing a computer to execute a method of identifying a document within a block of text, the method includes tokenizing, comparing, filtering, and matching steps. A block of text is tokenized into a plurality of text tokens according to at least one rule parser. Each of the plurality of text tokens is sequentially compared to a plurality of document tokens sequentially to determine if the text token matches one of the plurality of document tokens. The plurality of document tokens correspond to a plurality of documents which have been tokenized according to the at least one rule parser. Each matched text token is filtered according to predetermined filtering criteria to generate one or more candidate text tokens. A sequence of candidate text tokens from the one or more candidate text tokens is then matched to a sequence of document tokens. These candidate text tokens occur in sequential order within the block of text.

In yet another embodiment, a data processing apparatus for identifying a document within a block of text. The apparatus includes a processor configured to: (i) tokenize a block of text into a plurality of text tokens according to at least one rule parser; (ii) compare each of the plurality of text tokens to a plurality of document tokens sequentially and determine if the text token matches one of the plurality of document tokens, wherein the plurality of document tokens correspond to a plurality of documents which have been tokenized according to the at least one rule parser; (iii) filter each matched text token according to predetermined filtering criteria to generate one or more candidate text tokens; and (iv) match a sequence of candidate text tokens from the one or more candidate text tokens to a sequence of document tokens, wherein the sequence of candidate text tokens occur in sequential order within the block of text.

Further features and advantages of the present invention will become more apparent from the detailed description set forth below when taken in conjunction with the following drawings.

BRIEF DESCRIPTION OF THE DRAWINGS

The features and advantages of the present invention will become more apparent from the detailed description set forth below when taken in conjunction with the following drawings.

FIGS. 2A, 2B, 2C, and 2D are examples of documents stored within a name database.

FIG. 3 shows an inverted index comprising a plurality of document tokens corresponding to the documents shown in FIGS. 2A, 2B, 2C, and 2D.

FIGS. 5A, 5B, and 5C are examples of documents stored within a name database.

FIG. 6 shows an inverted index comprising a plurality of document tokens corresponding to the documents shown in FIGS. 5A, 5B, and 5C.

DETAILED DESCRIPTION

Overview

The example embodiments of the invention presented herein are directed to systems, methods, and computer program products for extracting named entities from a block of text related to the musical artists and songs. This is for convenience only, and is not intended to limit the application of the present invention. In fact, after reading the following description, it will be apparent to one skilled in the relevant art how to implement the following invention in alternative embodiments, involving, for example, television, movies or games.

Figure 1:
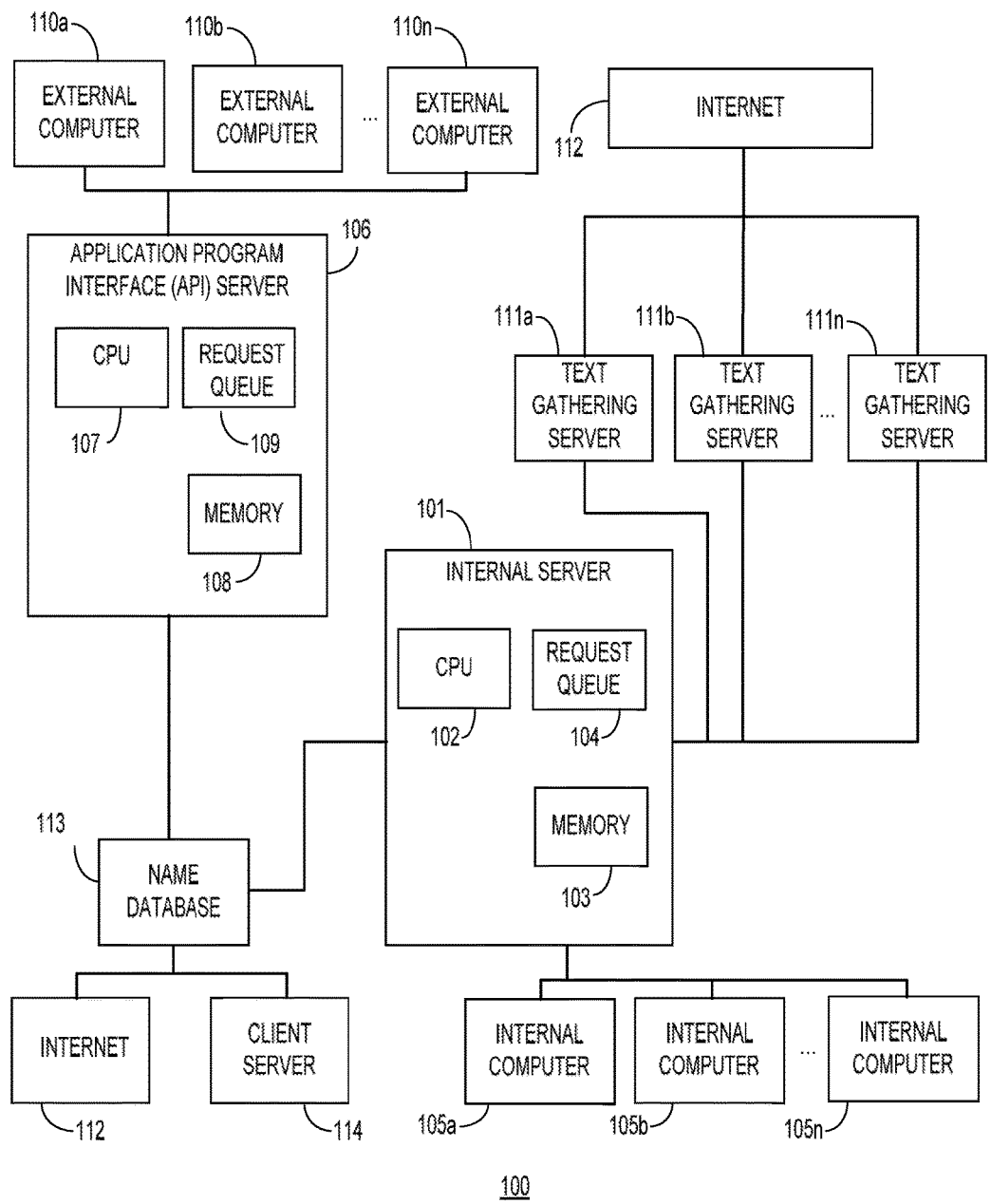
FIG. 1 is an overview of a physical environment for extracting named entities from a block of text.

FIG. 1 is an overview of a system 100 for extracting a named entity from a block of text. As shown in FIG. 1, separate servers execute program code to manage requests from internal and external users, each having an individual request queue. As discussed below, this configuration provides a higher level of bandwidth and query performance because it segregates an internal server from external requests which could overwhelm the internal server. Alternatively, the program code could be stored and executed on a single server, with requests from internal and external users managed by a single request queue. In addition, elements shown in FIG. 1 need not be contained in separate physical structures, and may be incorporated into a single apparatus.

FIG. 1 shows an internal server 101 that includes an internal server processor 102, an internal server memory 103, and an internal server request queue 104. The internal server processor 102 runs a named entity extraction program stored in the internal server memory 103, the details of which are discussed below. The internal server memory 103 also serves as a storage cache for temporarily storing data when the program is run and may be configured to permanently store such information, including extracted artist and song names. The internal server request queue 104 manages requests from internal computers 105a, 105b, ..., 105n to execute the named entity extraction program.

An application program interface (API) server 106 includes an API server processor 107, an API server memory 108, and an API server request queue 109. The API server 106 receives requests to run the named entity extraction program which originate from external computers 110a, 110b, ..., 110n. This arrangement provides a layer of network security by preventing the internal server 101 from being inundated with external requests. An external computer 110a, 110b, ..., 110n calls the named entity extraction program, stored in the API server memory 108 to analyze a block of text sent from the external computer 110a, 110b, ..., 110n. It should be understood that the term "text" is used for convenience and may refer to, for example, alpha characters, numeric characters, alphanumeric characters, American Standard Code for Information Interchange (ASCII) characters, symbols, or foreign language unicode (e.g. UTF-8). The API request queue 109 manages and prioritizes requests from the external computers 110a, 110b, ..., 110n.

The internal server 101 connects to one or more text gathering servers 111a, 111b, ..., 111n. In one embodiment, the text gathering servers 111a, 111b, ..., 111n are configured to perform web crawls in an asynchronous manner to gather data from the Internet 112. In other words, each text gathering server 111a, 111b, ..., 111n performs web crawls independently from another text gathering server 111a, 111b, ..., 111n. The text gathering servers 111a, 111b, ..., 111n can retrieve text from several web pages each day (e.g., millions of webpages).

When performing web crawls, each text gathering server 111a, 111b, ..., 111n loads a webpage and collects the text data contained therein. One or more of the text gathering servers 111a, 111b, ..., 111n may be configured to cyclically load a predetermined sequence of webpages associated with certain types of websites; for example, websites devoted to coverage of the music industry, e.g. MTV, VH1, or Rolling Stone. These websites are continually updated based on recent events, and therefore may contain relevant information. The text gathering servers 111a, 111b, ..., 111n may also be configured to seek out websites based upon a search algorithm. The text gathering servers 111a, 111b, ..., 111n can collect text from any website which is publicly accessible including Facebook pages, Twitter feeds, Google+ pages, YouTube postings and the like.

Once a text gathering server 111a, 111b, ..., 111n loads a webpage, the HyperText Markup Language (HTML) code CSS (Cascading Style Sheets), and JavaScript (JS) elements are removed while keeping the viewable text content from each element. While text contained within each element can be extracted and analyzed, the text gathering server 111a, 111b, ..., 111n may also be configured to identify and extract text from the largest continuous block of text within the webpage. For certain websites, analyzing only the largest block of text may be more efficient than analyzing every block of text. For example, relevant information from a news provider may come in the form of an article, which is also likely the largest block of text. Rather than analyzing the other blocks of text which are unlikely to contain relevant information, only the largest block of text is analyzed. Processing time and resources are thereby conserved without a significant loss of relevant information. Whether each block of text or only the largest block of text is analyzed may be determined based on the type of website. In either case, the text within each block is removed and temporarily stored within a text database connected to, or a part of, the text gathering servers 111a, 111b, . . . , 111n.

The text gathering servers 111a, 111b, . . . , 111n may also collect information from other sources besides webpages, such as, for example, an RSS (Rich Site Summary), a voice-to-text translation, an OCR (Optical Character Recognition) output, a word processing document, or a simple text document. While this information may be retrieved by the text gathering servers 111a, 111b, . . . , 111n connecting remotely to the source of the information, the information may also be supplied directly to one or more of the text gathering servers 111a, 111b, . . . , 111n by, for example, a computer readable storage medium.

The text gathering servers 111a, 111b, . . . , 111n treat information retrieved or supplied from a source other than a webpage in an analogous manner to information retrieved from a webpage. Non-textual elements are removed from the retrieved information, while the text data is retained. The retained text data may then be analyzed in its entirety or only a portion thereof. Similar to the case involving a website, analyzing only a portion of the text data may be more efficient. For example, if the source of the information is a voice-to-text translation of an interview, the relatively larger blocks of text likely contain substantive responses to key questions, which yield a higher likelihood of containing relevant information. Accordingly, a user can set criteria for choosing whether to analyze only a portion of or the entirety of the collected text from a source.

As discussed below in more detail, the named entity extraction program analyzes the collected text by comparing the collected text to documents stored in a name database 113, discussed below, and reports the identity of an artist or song contained within the block of text when a match occurs. Therefore, the named entity extraction program is language invariant, and can effectively extract named entities from text regardless of the language of the collected text.

The text gathering servers 111a, 111b, . . . , 111n send requests to analyze the collected text to the internal server 101. These requests are queued in the internal server 101 or the internal server request queue 104 until called for and processed by the internal server processor 102. A request to analyze a block of text may be accompanied by the block of text itself. In such a circumstance, the block of text may be temporarily stored in the internal server memory 103. Alternatively, the block of text may remain on the text gathering server 111a, 111b, . . . , 111n until called for by the internal server processor 102.

The internal server 101 and the API server 106 are connected to a name database 113. Name database 113 may be physically stored on the internal server 101 or on the API server 106, or provided in a separate server, as shown in FIG. 1. In one embodiment the name database 113 stores a plurality of artist names and song names, along with aliases and common misspellings. For example, the band "Led Zeppelin" is commonly referred to by its alias "Led Zep" and often misspelled "Led Zeppellin" or "Led Zepelin." An alias or misspelled artist or song name, may still lead to relevant information. Accordingly, known aliases and common misspellings of an artist or a song are included in the name database 113 to ensure the maximum amount of relevant information is obtained from analyzing the text retrieved by the text gathering servers 111a, 111b, . . . , 111n. The aliases and common misspellings are then associated with the formal name for the artist or song.

Each artist name, song name, alias, and common misspelling stored in the name database 113 is considered a document. Thus, in the case of the band "Led Zeppelin," the alias "Led Zep" is stored as a document and the common misspellings "Led Zeppellin" and "Led Zepelin" are stored as two separate documents. A user may choose to add a particular misspelling to the name database 113 as a separate document stored therein, if they discover that the artist or song is commonly misspelled in that particular manner. Of course, there are numerous possible misspellings for any particular artist or song. Accordingly, the artist or song name is also processed through a phonetic algorithm (e.g., Metaphone or Soundex). The phonetic algorithm converts the artist or song name into one or more phonetic codes, corresponding to how the artist or song name sounds. The phonetic codes are then stored in the name database, as described below.

Each document stored in the name database 113 includes a plurality of document tokens derived from the artist name or song name. A first set of document tokens is simply each of the terms in the artist name or song name. Additional sets of document tokens may be generated and stored according to different indexers. One indexer corresponds to the phonetic algorithm mentioned above. The indexer uses the phonetic algorithm to produce the phonetic codes corresponding to the artist's name or song name. The phonetic codes are then stored as a set of document tokens. Another type of indexer may convert symbols into words (e.g., an ampersand symbol "&" into "and"), and produce a corresponding set of document tokens. Still another type of indexer may filter out certain predetermined words and terms (e.g., "band" or "DJ"). As one of ordinary skill in the art will appreciate, numerous different indexers can be used to produce sets of document tokens associated with an artist or song. In one embodiment, duplicative document tokens produced by the different indexers are eliminated.

FIGS. 2A, 2B, 2C, and 2D are examples of four documents 201, 202, 203, and 204 stored within the name database 113. Each of the documents 201, 202, 203, and 204 includes the followings fields: a unique artist name (ARTIST NAME), artist identifier (ID) (ARTIST ID), and a unique document ID (DOCUMENT ID). The relative position of each document token within the artist name is also included.

The exemplary document shown in FIG. 2A corresponds to the "Dave Matthews Band" which is assigned an artist ID of "AR1234." FIGS. 2B and 2C are examples of two common aliases for the "Dave Matthews Band," "DMB" and "Dave Matthews." Aliases, rather than having unique artist ID values, refer back to the artist ID for the formal band name, in this case "AR1234." FIG. 2D illustrates an example of a common misspelling for the "Dave Matthews Band," in this instance a "t" is omitted. As with the aliases, the misspelling does not have a unique artist ID value, but rather refers back the artist ID for the formal band name.

Since new artists and songs are constantly emerging, and entries in the name database 113 are continuously updated. One mechanism for updating the entries is to obtain information on new artists and songs directly from the music label companies or other providers of music content, e.g. via client server 114. This may be accomplished by periodically downloading updated database files containing the information, or by receiving physical media containing the information. These entities may also be a source for aliases and common misspellings. Common misspellings of an artist or a song may also be entered by a user as separate documents in the name database 113.

To facilitate quick and efficient searching for artists and song titles, the name database 113 is arranged as an inverted full text index. FIG. 3 is an example of an inverted full text index 301 corresponding to the documents shown in FIGS. 2A, 2B, 2C, and 2D. To create the inverted full text index 301, each artist name in the documents 201, 202, 203, and 204 is tokenized according to one or more rule parsers. As one of ordinary skill in the art will appreciate, tokenization is a process of breaking up a series of words, phrases, or symbols into individual elements. This is accomplished by analyzing the series of words for certain elements such as spaces, punctuation, and separates possessives which indicate boundaries between words. For example, in FIG. 2A the artist name "Dave Matthews Band" in document 201 has been tokenized into three document tokens: "Dave", "Matthews", and "Band". In an inverted full text index, the position of each document token within the document is retained. Thus, as shown in FIGS. 2A, 2B, 2C, and 2D, each document token includes a position value corresponding to its position within the artist name.

In addition to tokenization, the artist or song name is also indexed according to one or more indexers. As discussed above, one indexer uses a phonetic algorithm to convert each term in the artist or song name into a phonetic code. In the exemplary embodiment shown in FIGS. 2A-2D, each term in the ARTIST NAME field has been indexed according to a phonetic algorithm to generate phonetic codes, which are stored as separate document tokens and represented by brackets surrounding the terms inputted into the phonetic algorithm, e.g., "<DAVE>". This is merely a convenient representation, however, as the particular phonetic code is dependent upon the phonetic algorithm which is used.

Additional indexers may also be used. For example, one indexer indexes the artist or song name according to a list of stopwords which are considered generic and unlikely to further in identification of an artist or song, e.g., "DJ" and "band." In such a circumstance, this indexer will return document tokens "DAVE" and "MATTHEWS" for an entry of "DAVE MATTHEWS BAND" in the ARTIST NAME field, rather than "DAVE," "MATTHEWS" and "BAND." This type of indexer is represented in FIGS. 2A and 2D by showing the document token "BAND" in dashed lines.

As shown in FIG. 3, for each document token, the documents in which that document token appears, and the position of the document token therein, are associated to that document token. For example, the document token "DAVE" is associated with documents/position [F3x89, 1], [F3x91, 1], and [F3x92, 1]. Once the index is created it is relatively quick and efficient to identify the documents in which a token appears.

In one embodiment, the name database 113 may be configured as a relational database where a table of terms relating to the documents is stored. Still further, the name database 113 may be set up as a key-value storage, which is a non-relational storage method where a key is stored and when queried returns all the values associated with that key. For example, if the key is "Matthews", all of the data entries containing "Matthews" would be returned. One of the advantages of the key-value storage method is that it also provides a relatively fast lookup.

The contours of the environment having been described above, a first embodiment for extracting a named entity from a block text will now be described with reference to FIGS. 4A-11.

Figures 4A, 4B:
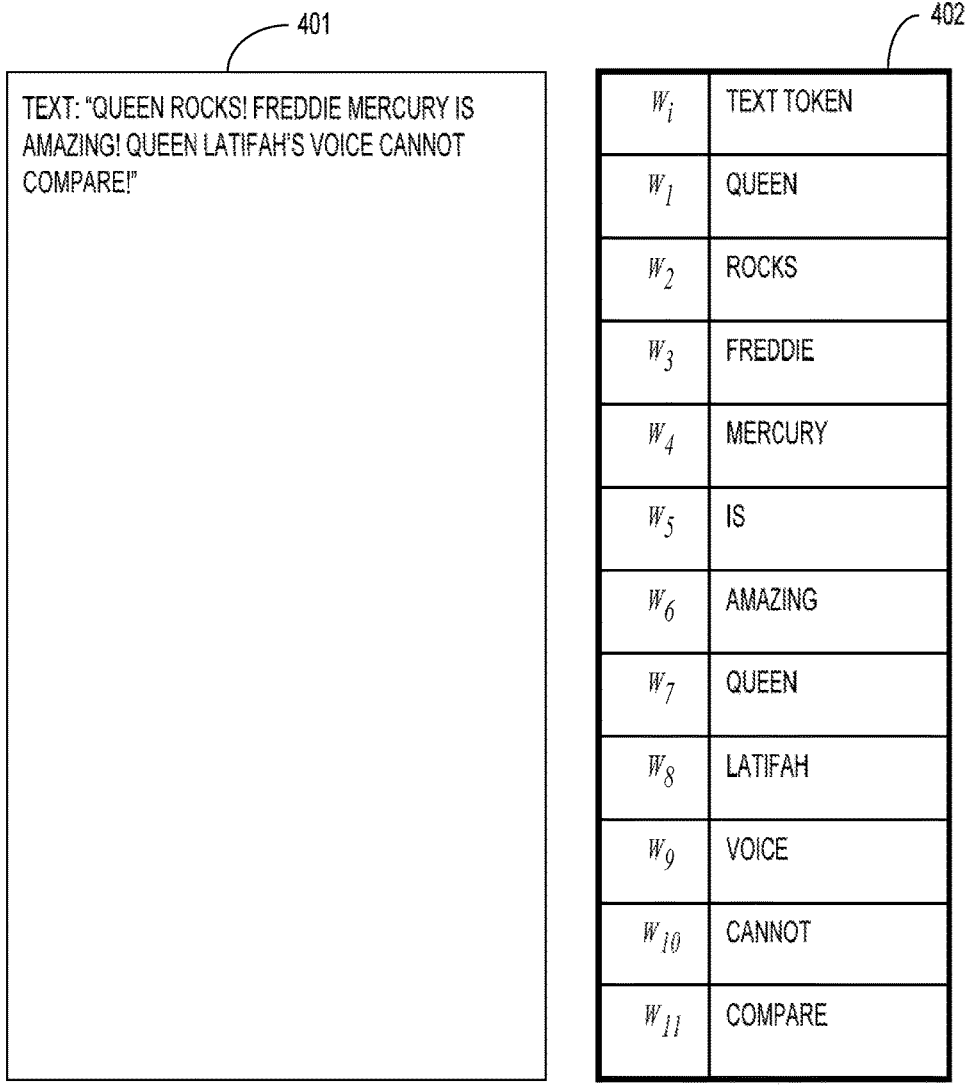
FIG. 4A shows a block of text.
FIG. 4B shows a plurality of text tokens corresponding to the block of text in FIG. 4A.

To illustrate features of this embodiment, an example block of text 401 shown in FIG. 4A will be partially analyzed. The block of text 401 may correspond to, for example, a social feed message gathered by one of the text gathering servers 111a, 111b, . . . , 111n. This particular block of text 401 is merely demonstrative, and could be of any length and any language, as discussed above.

As shown in FIGS. 4A-4B, the block of text 401 is tokenized according to rule parsers which ignore punctuation, grammar, and possessives. Thus, the exclamation points, apostrophe, and possessive "s" within the block of text 401 are ignored. The rule parsers also treat spaces as boundaries between separate words. Based on these rule parsers, the block of text 401 is converted in a plurality of text tokens 402, as shown in FIG. 4B.

FIGS. 5A, 5B, and 5C shows three documents 501, 502, and 503 stored in the name database 113. The documents 501, 502, and 503 haven been tokenized according to the same rule parsers which tokenized the block of text 401 in FIG. 4A. The resulting document tokens 601, 602, 603, and 604 populate an inverted index 600 shown in FIG. 6 which is stored in the name database 113. In addition, each term in the artist's name, in documents 501, 502, and 503, has been indexed by a phonetic algorithm to produce a corresponding set of document tokens 605, 606, 607, and 608 which are also included in the inverted index 600.

Figure 7:
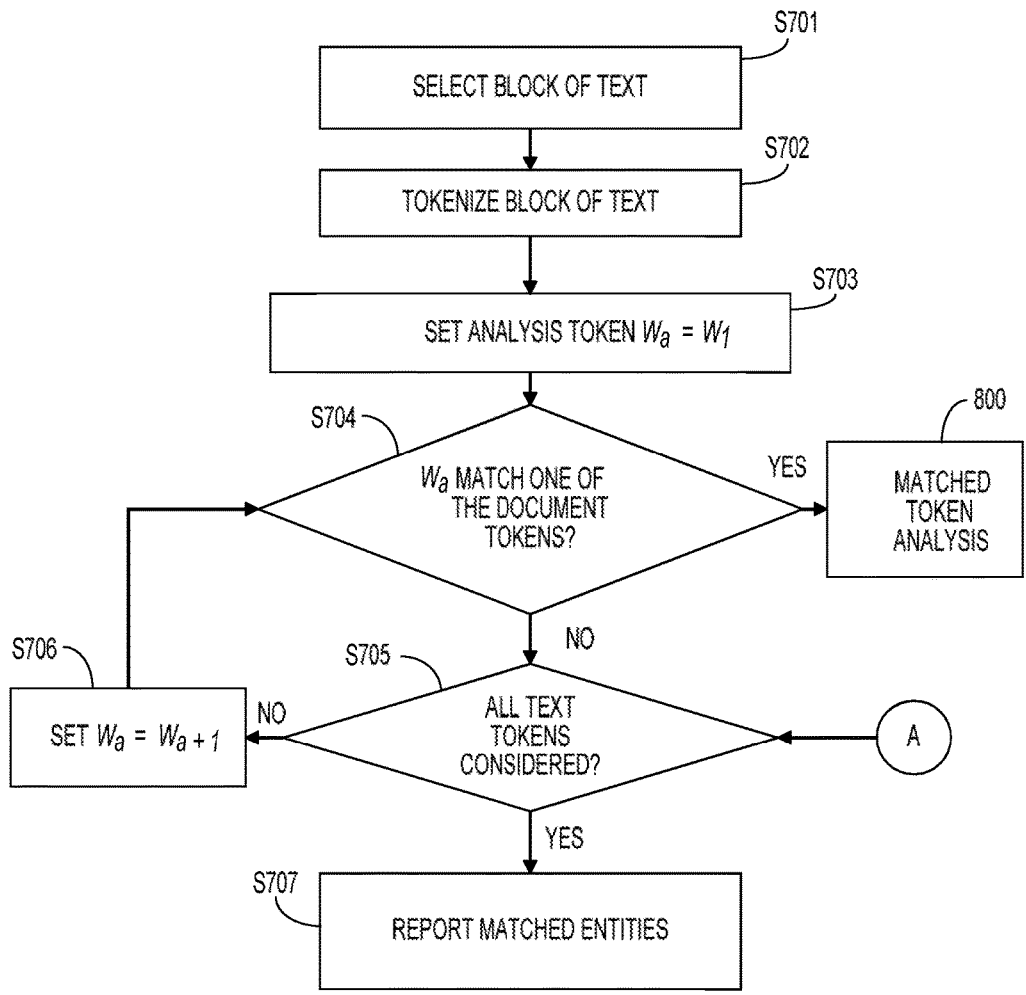
FIG. 7 is a flowchart showing the overall process of identifying a named entity within a block of text.

FIG. 7 is a flowchart showing the overall process of identifying a named entity within a block of text. In step S701, the block of text is selected, and in step S702 the block of text 401 is tokenized, according to the processes described above.

In step S703 the first text token $w_1$ of the text tokens 402 from the tokenized block of text 401 is designated as the analysis token $w_a$. In the illustrative example, the first text token $w_1$ corresponds to "Queen," and is designated as the analysis token $w_a$. In step S704 the analysis token $w_a$ is compared to the documents tokens 601, 602, 603 and 604 stored in the name database 113 to see if the analysis token $w_a$ matches one of the document tokens 601, 602, 603 and 604. If the analysis token $w_a$ does not match of one the document tokens 601, 602, 603, and 604 generated by tokenizing the artist names in documents 501, 502, and 503, then the analysis token $w_a$ is also indexed by the same indexers used for the documents 501, 502, and 503, to produce a phonetic code corresponding to the analysis token $w_a$. This phonetic code is then compared to the document tokens 605, 606, 607, and 608. Because the document tokens 601-608 are stored in an inverted index this lookup process is fast and efficient.

If the phonetic code corresponding to the analysis token $w_a$ matches one of the document tokens 605, 606, 607, and 608, then the analysis token $w_a$ likely represents a misspelling of one of the terms in artist name in at least one of the documents. Since misspellings nevertheless may lead to relevant information, the process would proceed to step S800 in FIG. 7. In the illustrative example, however, none of the text tokens 402 are misspelled, and thus the result when each of the text tokens 402 is analyzed will be a direct match with no phonetic matches.

In the illustrative example, the analysis token $w_a$ ("Queen") matches document token 601, which is contained in two documents identified by their respective document IDs [F2x01] and [F2x03]. Any document containing a document token which matches the analysis token $w_a$ is referred to as a hit document. Because the analysis token $w_a$ matches one of the document tokens 601, 602, 603 and 604, the result of step S704 is that process would proceed to the matched token analysis. If, however, the analysis token $w_a$ did not match any of the document tokens 601, 602, 603 and 604, the process would proceed to consider whether the phonetic code of the analysis token $w_a$ matches one of the document tokens 605, 606, 607, and 608, as described above. If not, then the process would proceed to step S705 where it is determined whether all of the text tokens 402 have been analyzed.

One method for determining whether all of the text tokens 402 have been analyzed is to use a conditional flag. When the block of text 402 is tokenized in step S701 the number of resulting text tokens 402 can be stored. In the illustrative example, the number of text tokens is equal to 11. A counter i can be used to keep track of which text token $w_n$ is being analyzed. This also serves an additional purpose of determining where in the text block a particular text token $w_n$ is located. When the counter i is equal to the number of text tokens 402, the conditional flag is triggered to indicate that all of the text tokens 402 have been analyzed.

If in step S705 it is determined that all of the text tokens 402 have been analyzed, the process proceeds to step S707 where the name and position within the block of text 401 of any matched entities are reported, as will be discussed below in further detail.

If, however, in step S705 it is determined that all of the text tokens have not been considered, then the analysis token $w_a$ is set to $w_{a+1}$, e.g. to the next text token in sequential order within the block of text 401. In the illustrative example, the next text token $w_2$ is "rocks." The process then returns to step S704 to determine whether the analysis token $w_a$ matches one or more of the document tokens. If, as in the illustrative example, the result of step S704 is that $w_a$ matches one of the document tokens 601, 602, 603 and 604, then the process proceeds to a matched token analysis.

Figure 8:
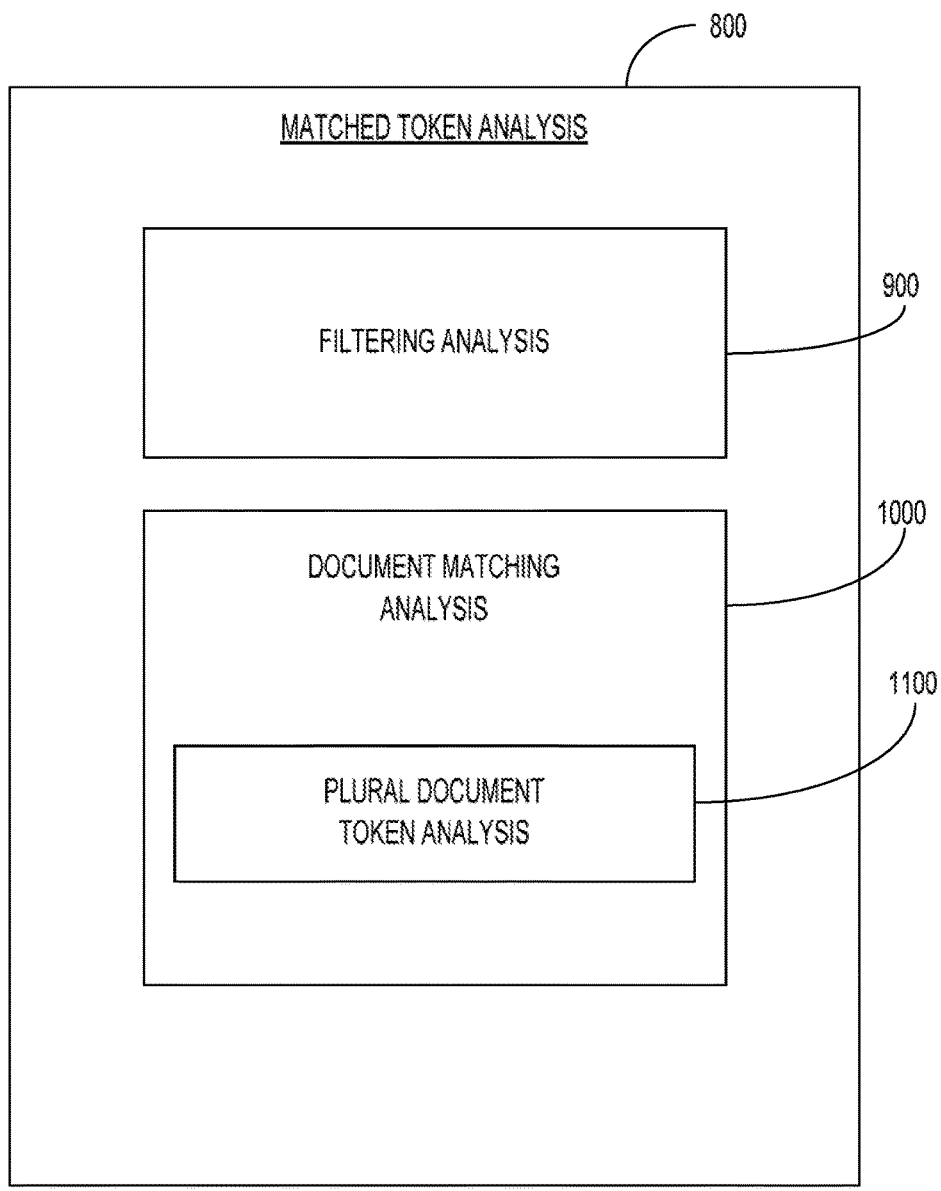
FIG. 8 is a hierarchical figure showing the various analyses within a matched token analysis.

As shown in FIG. 8, the matched token analysis 800 includes two sub-analyses: a filtering analysis 900 and a document matching analysis 1000. The document matching analysis further includes a plural document token analysis 1100.

Figure 9:
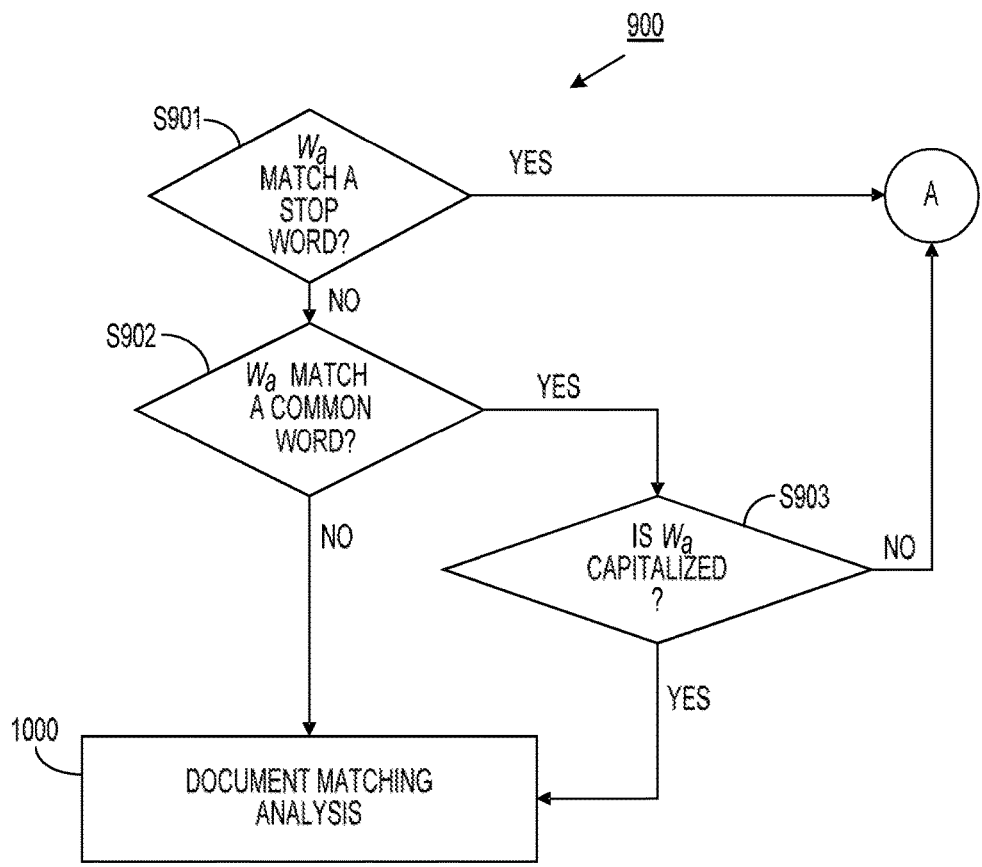
FIG. 9 is a flowchart corresponding to the filtering analysis.

The filtering analysis 900, shown in FIG. 9, eliminates matches which are unlikely to correspond to an artist or song name (or in the case of a movie or game, a movie or game title). In step S901 the analysis token $w_a$ is compared to a plurality of stop words contained in a stop word list stored in the internal server memory 103 or the API server memory 108. Whether the stop word list is called from the internal server memory 103 or the API server memory 108 depends upon which server is running the named entity extraction program. In this instance, the stop words are words which are deemed unlikely to aid in identifying the name of an artist or song, for example: I, the, it, an, and a. The stop words can be predetermined for example, by the system administrator, and can be updated (e.g., by the system administrator) as well.

In an alternative embodiment, the rule parsers can be configured to eliminate the stop words during the indexing process in step S702, essentially performing step S901 on the block of text 401 rather than on matching text tokens. In such an alternative embodiment, the filtering analysis would not include a stop word check S901, as such a step would be redundant.

If, in step S901, the analysis token $w_a$ matches one of the stop words then the process returns to step S705 in FIG. 7 to determine if there are any further text tokens to be analyzed. If, however, the analysis token $w_a$ does not match one of the stop words, the process proceeds to step S902 where the analysis token $w_a$ is compared to a common word list.

The common word list is populated with all English dictionary words, with the exception of proper nouns. If the analysis token $w_a$ matches one of the English words, a capitalization check is performed on the analysis token $w_a$, in step S903. While it is possible for an artist or song name to include a common English word, unless the word is capitalized it is unlikely to be intended to refer to an artist or song name. Such a situation is shown in the illustrative example, where "Queen" matches the common English word "queen."

If the capitalization check determines that the analysis token $w_a$ is not capitalized, then the process returns to step S705 in FIG. 7 to determine if there any further text tokens to be analyzed. Otherwise, if it is determined (i) that the analysis token $w_a$ matches one of the plurality commons words and is capitalized, or (ii) that the analysis token $w_a$ does not match one of the plurality of common words, then the analysis token $w_a$ is identified as a candidate token, and the process proceeds to the document matching analysis 1000 shown in FIG. 10.

In the illustrative example, "Queen" does not match any of the stop words, but does match the common word "queen." Because the analysis token $w_a$ is capitalized, the process proceeds to the document matching analysis 1000.

Figure 10:
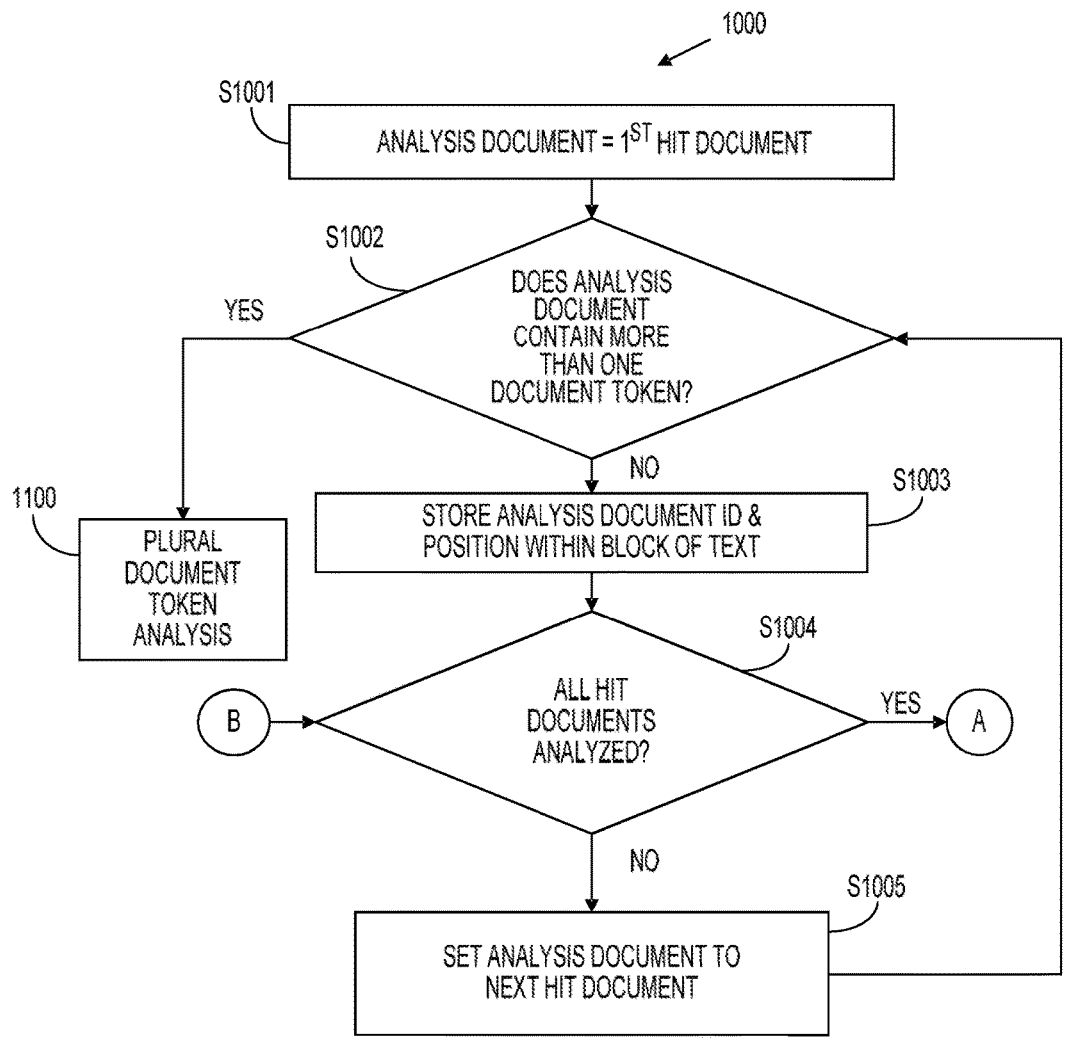
FIG. 10 is a flowchart corresponding to the document matching analysis.

The document matching analysis, shown in FIG. 10, is designed to determine whether the document tokens within a hit document match a sequence of text tokens within the block of text.

To begin, in step S1001 an analysis document is set as the first hit document. In the illustrative example, the first hit document is document 501, shown in FIG. 5A. This selection is arbitrary and any of the hit documents could be analyzed first. In step S1002 it is determined whether the analysis document contains more than one document token. If the analysis document contains only one document token, then the analysis document is considered to be a matched document, and the process proceeds to step S1003 where the analysis document ID and the position of the analysis document within the block text is stored. The process then proceeds to step S1004 to determine if all of the hit documents have been considered. If not, the analysis document is set as the next hit document in step S1005 and the process returns to step S1002.

If, however, it is determined in step S1004 that all of the hits documents have been considered, then the process returns to step S705 in FIG. 7 to determine if all of the text tokens have been analyzed.

In the illustrative example, the analysis document 501 is set as the first hit document. The analysis document 501 contains only one document token "QUEEN". Thus, the analysis document ID, which in this case is [F2x01], is stored. In addition, the position of the document within the block of text is also stored. The position of the document within the block of text is easily determined by simply referring to the present value of the counter i, which in this instance is equal to 1.

In the illustrative example, the candidate token occurs in more than one document. Therefore, the result in step 1004 is "no" and the analysis document is set to the next hit document, which is [F2x03], in step S1005 and the process returns to step S1002. [F2x03] contains two document tokens "QUEEN" and "LATIFAH", thus the process proceeds to the plural document token analysis 1100.

The plural document token analysis 1100 determines if a string of sequential text tokens matches the document tokens that comprise the analysis document. More specifically, the plural document token analysis 1100 will determine whether the text tokens which come after the candidate token, in sequential order, match the sequential order of the document tokens in the analysis document.

Figure 11:
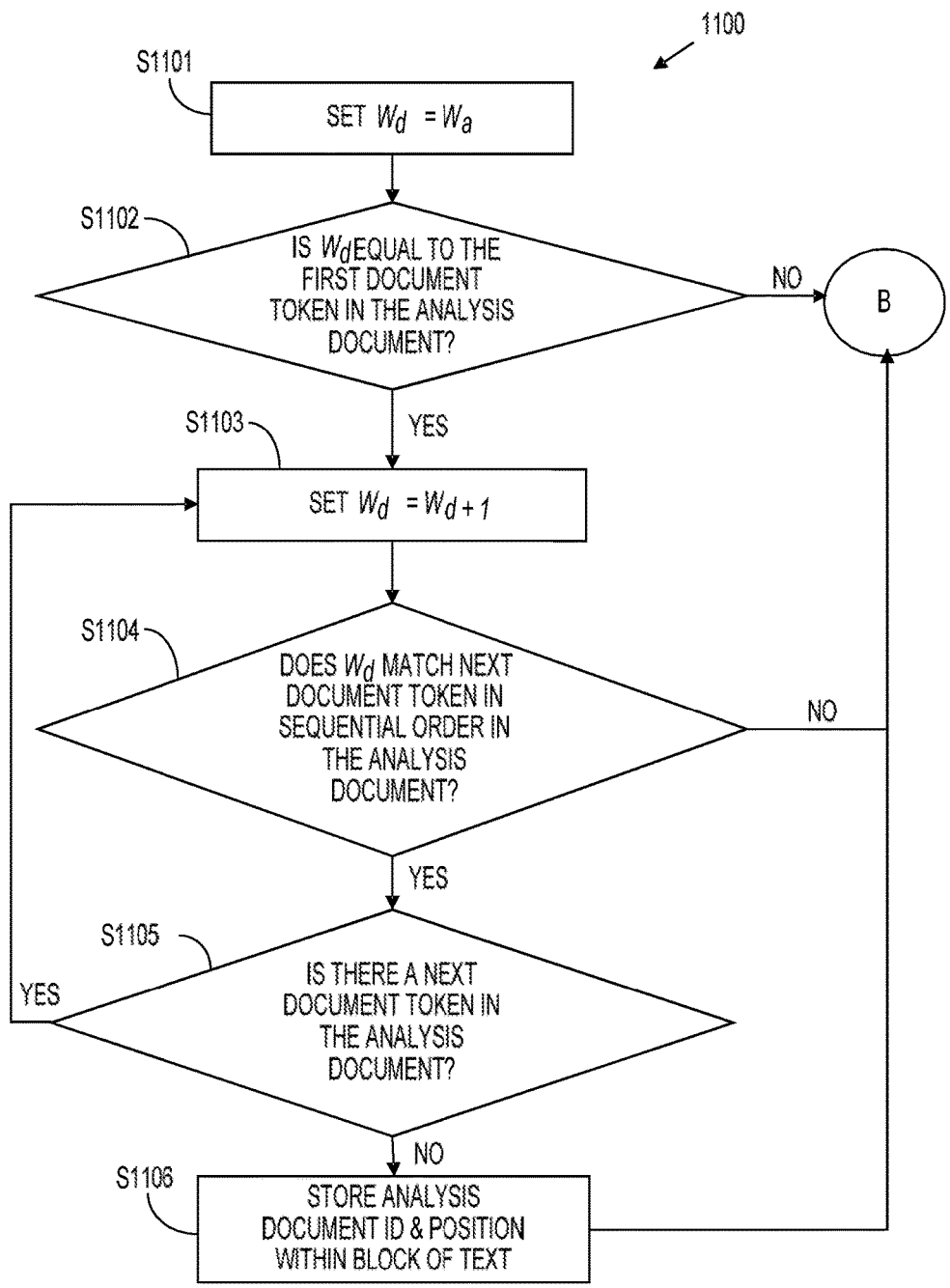
FIG. 11 is a flowchart corresponding to the plural document token analysis.

Because the plural document token analysis involves analyzing text tokens which have yet to be compared against the entire set of documents, in step S1101 of FIG. 11 a temporary token $w_d$ takes on the value of the candidate token $w_a$ so as to preserve the overall progress of the analysis of the block of text 401. Of course, this could be accomplished by other means. For example, the value of the counter i could saved in memory, and once the plural document token analysis 1100 is completed, the analysis token could be set to $w_i$.

In step S1102, it is determined whether the temporary token $w_d$ is equal to the first document token in the analysis document. If not, then a string of text tokens beginning with the candidate token in the block of text, cannot match the string of document tokens within the analysis document. For example, let the temporary token $w_d$ take on the value of, "MATTHEWS," and the analysis document be set to document ID [F3x89], shown in FIG. 2A, corresponding to the artist "DAVE MATTHEWS BAND." Because the temporary token $w_d$ does not match the first document token ("DAVE"), regardless of the text tokens that follow "MATTHEWS" in the block of text, a string of text tokens beginning with the temporary token $w_d$ will not match the sequential order of the document tokens in the analysis document. Thus, if it is determined in S1102 that the temporary token $w_d$ does not match the first document token in the analysis document, the process returns to step S1004 in FIG. 10.

If the result of step S1102 is that the temporary token $w_d$ matches the first document token in the analysis document, then it possible that a string of text tokens beginning with the temporary token $w_d$ could match the sequential order of the document tokens in the analysis document. Thus, the process proceeds to step S1103 where the next text token in the block of text is set as the temporary token, i.e., $w_d = w_{d+1}$. In step S1104 it is checked whether the temporary token $w_d$ matches the next document token in sequential order in the analysis document. If not, the process returns to step S1004 in FIG. 10. If, however, the temporary token $w_d$ matches the next document token in sequential order in the analysis document, then a check is performed in step S1105 to determine if there is another document token within the analysis document. If there is another document token within the analysis document, then the process returns to step S1103. If not, then the result is that a plurality of text tokens, in sequential order, in the block of text matches the sequence of documents tokens within the analysis document. Accordingly, the document ID of the analysis document and its position within the block of text is stored in step S1106, and the process returns to step S1004 in FIG. 10.

If it is determined in step S1004 in FIG. 10 that all of the hit documents have been analyzed, the process returns to step S705 in FIG. 7. If not, then the process returns to step S1005 and the next hit document is analyzed.

After reporting document [F2x01] as a matched document, the next hit document, [F2x03], is set as the analysis document. [F2x03] contains two document tokens "QUEEN" and "LATIFAH," thus the process proceeds to the plural document token analysis in FIG. 11.

The analysis token $w_a$ is presently equal to the first text token $w_1$ ("Queen"). In step S1101 the temporary token $w_d$ takes on the value of the analysis token $w_a$. In step S1102 it is determined that the temporary token $w_d$ ("Queen") is equal to the first document token 601 ("QUEEN"). Thus, the process proceeds to step S1103 where the temporary token $w_d$ takes on the value of the next text token in sequential order in the block of text 402, which in this instance is $w_2$ (e.g., "rocks"). The process proceeds to step S1104 where it is determined that that the temporary token $w_d$ (e.g., "rocks") does not match the next document token 604 ("LATIFAH") in sequential order in the analysis document [F2x03]. Accordingly, [F2x03] does not correspond to a matched document, and the process returns to step S1004 in FIG. 10. With all of the hit documents having been analyzed, the process returns to step S705 in FIG. 7.

At this point, the first text token $w_1$ (e.g., "Queen") in the block of text has been analyzed, and the result is that document ID "F2x01" corresponding to the artist name "QUEEN" has been determined to be a match. Because more text tokens remain, the result of step S705 will be that more text tokens remain to be analyzed, and the process will proceed to step S706 where the next text token, $w_2$ (e.g., "rocks") will be analyzed according to the above described processes.

Once it is determined in step S705 in FIG. 7 that all text tokens within the block of text have been analyzed, then the process proceeds to step S707 where the matched documents and their position within the block of text are reported to the user.

While the above description is a musical implementation, the invention is not limited to that field. The above features may also be applied to movies, games, television shows, literature, people, or any other field. For example, with respect to movies, blocks of text may be analyzed for movie titles. The name database 113 may store as, a plurality of documents, movie names, aliases, and common misspellings. Thus, the present invention is not limited to searching for artist or song names, but may applied to searching for any named entity within a block of text.

Figure 12:
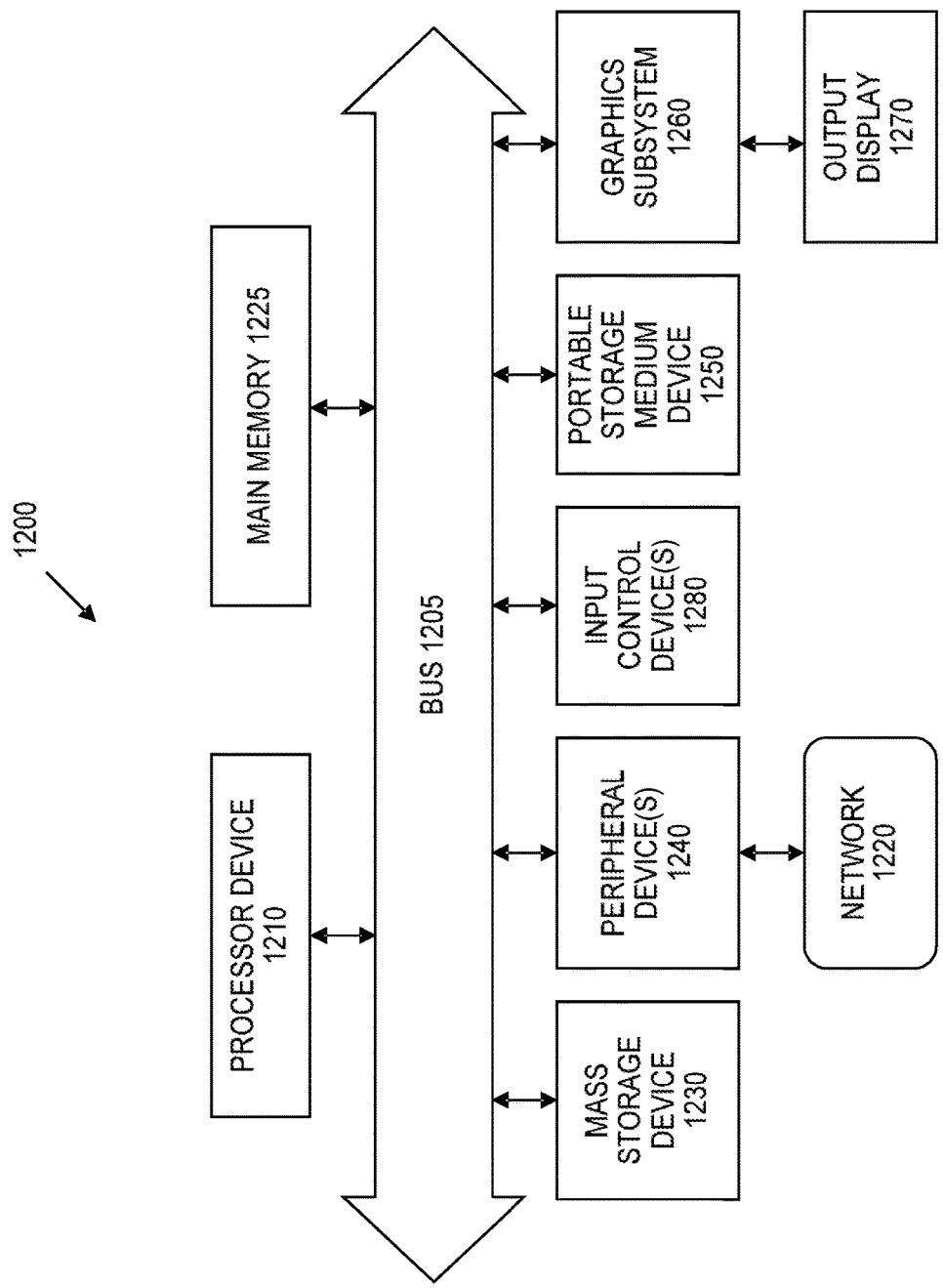
FIG. 12 is a block diagram of a general and/or special purpose computer in accordance with some of the example embodiments.

FIG. 12 is a block diagram of a general and/or special purpose computer 1200, which may be a general and/or special purpose computing device, in accordance with some of the example embodiments of the invention. The computer 1200 may be, for example, a user device, a user computer, a client computer and/or a server computer, among other things.

The computer 1200 may include without limitation a processor device 1210, a main memory 1225, and an interconnect bus 1205. The processor device 1210 may include without limitation a single microprocessor, or may include a plurality of microprocessors for configuring the computer 1200 as a multi-processor system. The main memory 1225 stores, among other things, instructions and/or data for execution by the processor device 1210. The main memory 1225 may include banks of dynamic random access memory (DRAM), as well as cache memory.

The computer 1200 may further include a mass storage device 1230, peripheral device(s) 1240, portable non-transitory storage medium device(s) 1250, input control device(s) 1280, a graphics subsystem 1260, and/or an output display interface 1270. For explanatory purposes, all components in the computer 1200 are shown in FIG. 12 as being coupled via the bus 1205. However, the computer 1200 is not so limited. Devices of the computer 1200 may be coupled via one or more data transport means. For example, the processor device 1210 and/or the main memory 1225 may be coupled via a local microprocessor bus. The mass storage device 1230, peripheral device(s) 1240, portable storage medium device(s) 1250, and/or graphics subsystem 1260 may be coupled via one or more input/output (I/O) buses. The mass storage device 1230 may be a nonvolatile storage device for storing data and/or instructions for use by the processor device 1210. The mass storage device 1230 may be implemented, for example, with a magnetic disk drive or an optical disk drive. In a software embodiment, the mass storage device 1230 is configured for loading contents of the mass storage device 1230 into the main memory 1225.

The portable storage medium device 1250 operates in conjunction with a nonvolatile portable storage medium, such as, for example, a compact disc read only memory (CD-ROM), to input and output data and code to and from the computer 1200. In some embodiments, the software for storing information may be stored on a portable storage medium, and may be inputted into the computer 1200 via the portable storage medium device 1250. The peripheral device(s) 1240 may include any type of computer support device, such as, for example, an input/output (I/O) interface configured to add additional functionality to the computer 1200. For example, the peripheral device(s) 1240 may include a network interface card for interfacing the computer 1200 with a network 1220.

The input control device(s) 1280 provide a portion of the user interface for a user of the computer 1200. The input control device(s) 1280 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 1200 may include the graphics subsystem 1260 and the output display 1270. The output display 1270 may include a cathode ray tube (CRT) display and/or a liquid crystal display (LCD). The graphics subsystem 1260 receives textual and graphical information, and processes the information for output to the output display 1270.

Each component of the computer 1200 may represent a broad category of a computer component of a general and/or special purpose computer. Components of the computer 1200 are not limited to the specific implementations provided here.

Software embodiments of the example embodiments presented herein may be provided as a computer program product, or software, that may include an article of manufacture on a machine accessible or machine readable medium having instructions. The instructions on the non-transitory machine accessible machine readable or computer-readable medium may be used to program a computer system or other electronic device. The machine or computer-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "computer-readable", "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A data processing method of identifying a document within a block of text, comprising:

tokenizing a block of text into a plurality of text tokens according to at least one rule parser;

comparing each of the plurality of text tokens to a plurality of document tokens sequentially and determining if a text token matches one of the plurality of document tokens, wherein the plurality of document tokens correspond to one or more of a plurality of documents which have been tokenized according to the at least one rule parser;

filtering each matched text token according to predetermined filtering criteria to generate one or more candidate text tokens; and matching a sequence of candidate text tokens from the one or more candidate text tokens to a sequence of document tokens, wherein the sequence of candidate text tokens occurs in sequential order within the block of text.

2. A data processing method according to claim 1, wherein the predetermined filtering criteria includes a plurality of stop words and a plurality of common words.

3. A data processing method according to claim 1, wherein the plurality of documents include artist names, misspellings of the artists names, aliases of the artist names, song titles, misspellings of the song titles, and aliases of the song titles.

4. A data processing method according to claim 1, further comprising: acquiring the block of text from a webcrawl.

5. A data processing method according to claim 1, wherein the plurality of documents are stored in an inverted index.

6. A data processing method according to claim 1, further comprising: notifying a user of (i) a matched document corresponding to the sequence of document tokens which match the sequence of candidate text tokens, and (ii) a position of the matched document within the block of text.

7. A non-transitory computer readable storage medium storing a computer program for causing a computer to execute a method of identifying a document within a block of text, the method comprising:

tokenizing a block of text into a plurality of text tokens according to at least one rule parser;

comparing each of the plurality of text tokens to a plurality of document tokens sequentially and determining if a text token matches one of the plurality of document tokens, wherein the plurality of document tokens correspond to one or more of a plurality of documents which have been tokenized according to the at least one rule parser;

filtering each matched text token according to predetermined filtering criteria to generate one or more candidate text tokens; and matching a sequence of candidate text tokens from the one or more candidate text tokens to a sequence of document tokens, wherein the sequence of candidate text tokens occur in sequential order within the block of text.

8. A non-transitory computer readable storage medium according to claim 7, wherein the predetermined filtering criteria includes a plurality of stop words and a plurality of common words.

9. A non-transitory computer readable storage medium according to claim 7, wherein the plurality of documents include artist names, misspellings of the artists names, aliases of the artist names, song titles, misspellings of the song titles, and aliases of the song titles.

10. A non-transitory computer readable storage medium according to claim 7, wherein the method further comprises:

acquiring the block of text from a webcrawl.

11. A non-transitory computer readable storage medium according to claim 7, wherein the plurality of documents are stored in an inverted index.

12. A data processing apparatus for identifying a document within a block of text, comprising:

a processor configured to:

(i) tokenize a block of text into a plurality of text tokens according to at least one rule parser;

(ii) compare each of the plurality of text tokens to a plurality of document tokens sequentially and determine if a text token matches one of the plurality of document tokens, wherein the plurality of document tokens correspond to one or more of a plurality of documents which have been tokenized according to the at least one rule parser;

(iii) filter each matched text token according to predetermined filtering criteria to generate one or more candidate text tokens; and (iv) match a sequence of candidate text tokens from the one or more candidate text tokens to a sequence of document tokens, wherein the sequence of candidate text tokens occur in sequential order within the block of text.

13. A data processing apparatus according to claim 12, wherein the predetermined filtering criteria includes a plurality of stop words and a plurality of common words.

14. A data processing apparatus according to claim 12, wherein the plurality of documents include artist names, misspellings of the artists names, aliases of the artist names, song titles, misspellings of the song titles, and aliases of the song titles.

15. A data processing apparatus according to claim 12, wherein the processor is further configured to acquire the block of text from a webcrawl.

16. A data processing apparatus according to claim 12, wherein the plurality of documents are stored in an inverted index.

17. A data processing apparatus according to claim 12, wherein the processor is further configured to notify a user of (i) a matched document corresponding to the sequence of document tokens which match the sequence of candidate text tokens, and (ii) a position of the matched document within the block of text.

* * * * *